(12) United States Patent
Wookey et al.

(10) Patent No.: US 7,707,187 B1
(45) Date of Patent: Apr. 27, 2010

(54) METHODS AND SYSTEMS FOR CACHING INFORMATION MODEL NODES

(75) Inventors: Michael J. Wookey, Los Gatos, CA (US); Paris E. Bingham, Jr., Aurora, CO (US)

(73) Assignee: Oracle America, Inc., Redwood Shores, CA (US)

( * ) Notice: Subject to any disclaimer, the term of this patent is extended or adjusted under 35 U.S.C. 154(b) by 684 days.

(21) Appl. No.: 11/080,085

(22) Filed: Mar. 14, 2005

(51) Int. Cl.
*G06F 7/00* (2006.01)
(52) U.S. Cl. .................. 707/661; 707/736
(58) Field of Classification Search ............. 707/2, 707/10; 711/159
See application file for complete search history.

(56) References Cited

U.S. PATENT DOCUMENTS

| | | | | |
|---|---|---|---|---|
| 5,247,647 A * | 9/1993 | Brown et al. | ............ | 714/1 |
| 6,823,426 B2 * | 11/2004 | Goldschmidt et al. | ....... | 711/134 |
| 2002/0091736 A1 * | 7/2002 | Wall | ............ | 707/513 |
| 2004/0153447 A1 * | 8/2004 | Hiratsuka et al. | ............ | 707/3 |
| 2005/0010727 A1 * | 1/2005 | Cuomo et al. | ............ | 711/138 |
| 2005/0192955 A1 * | 9/2005 | Farrell | ............ | 707/5 |

* cited by examiner

*Primary Examiner*—Cam Y T Truong
(74) *Attorney, Agent, or Firm*—Marsh Fischmann & Breyfogle LLP; Kent A. Lembke; Thomas J. Burton (57) ABSTRACT

Methods, systems, and articles of manufacture consistent with the present invention provide a cache manager that monitors access to an information model associated with a business service application and generates an access pattern for the information model based on a number of accesses to the information model.

21 Claims, 7 Drawing Sheets

METHODS AND SYSTEMS FOR CACHING INFORMATION MODEL NODES

CROSS-REFERENCE TO RELATED APPLICATIONS

This Application is related to the following U.S. Patent Applications, which are filed concurrently with this Application, and which are incorporated herein by reference to the extent permitted by law:

U.S. Ser. No. 11/080,893, entitled "METHODS AND SYSTEMS FOR IDENTIFYING AN ASSOCIATION BETWEEN INFORMATION MODE NODES";

U.S. Ser. No. 11/080,839, entitled "METHODS AND SYSTEMS FOR PERFORMING HIGH-THROUGHPUT INFORMATION REFINEMENT";

U.S. Ser. No. 11/080,894, entitled "METHODS AND SYSTEMS FOR PROVIDING SYNCHRONOUS NOTIFICATION OF INCOMING DATA TO A BUSINESS LOGIC TIER";

U.S. Ser. No. 11/080,831, entitled "METHODS AND SYSTEMS FOR DYNAMICALLY ALLOCATING INFORMATION REFINEMENT RESOURCES"; and U.S. Ser. No. 11/080,896, entitled "METHODS AND SYSTEMS FOR DYNAMICALLY GENERATING A NEW NODE IN AN INFORMATION MODEL".

FIELD OF THE INVENTION

The present invention relates to methods and systems for managing data for a business service application, and, in particular, to methods and systems for caching an information model associated with a business service application based on an access pattern generated for the information model node.

BACKGROUND OF THE INVENTION

Corporations and other enterprises commonly implement their business services on computer systems using a tiered architecture model that provides benefits such as reusability, flexibility, manageability, maintainability, and scalability for a business service application. The tiered architecture model segments an application's components into three tiers of services: the presentation or visualization tier, the middle or business logic tier, and the data or resource tier. These tiers do not necessarily correspond to physical locations on various computers on a network, but rather to logical layers of the application.

The visualization tier or layer provides an interface for the end user into the application. The business logic tier or layer (also referenced as the application layer) typically includes application specific code or components for enforcing a set of business and data rules used to implement a given business service. The resource tier is a data management layer for storing and retrieving information or persistent data usually stored in a database or in permanent storage.

In one implementation of the tiered architecture model, the application layer is operatively connected to the resource layer through information model nodes, which function as an interim translation layer for access to the persistent data that reside in the resource tier. An information model typically describes the combination of a data model (one type of information model node) and a content model (another type of information model node) together with one or more associations between information model nodes. A data model describes the techniques for describing well structured data within an application. For example, the technique or structure for formatting a paragraph in a document created using the Microsoft® Word application may be represented in a data model. A content model is a set of meta data that describes unstructured data, such as data that a user writes in a document described by a given information model. The meta data of the content model may describe associations between the unstructured data as well as information about the unstructured data. For example, the content model for the document created using the Microsoft® Word application may define meta data to include author, date created, data classification (e.g., letter, diagram, spreadsheet, etc.).

One of the problems the information model creates, however, is scalable access from the application layer. For example, a particular business service application may have access to thousands of information model nodes, each of which may have one or more associations to other information model nodes. Thus, a query or request by a user to view data related to one or more information model nodes typically requires significant time using traditional data access techniques, such as read through caching via a relational database management system ("RDBMS"). Furthermore, associations between the information models often lead to cache "bleed." Cache "bleed" occurs when an information model consists of a significant number of nodes and caching two disparate nodes connected by many other associated nodes causes the cache manager to store in cache memory all of the associated nodes in order to retrieve and store the desired two disparate nodes for access by the corresponding business application manager. Since conventional cache memory is a finite size, the cache manager is unable to store (e.g., "bleeds out") other nodes that would be of value to cache for the business service application.

Therefore, a need has long existed for a method and a system that overcome the problems noted above and others previously experienced.

SUMMARY OF THE INVENTION

Methods, systems, and articles of manufacture consistent with the present invention provide a cache manager program that significantly improves response to a user request to view data associated with a business service application by monitoring accesses by the business service application to an information model, identifying an access pattern for the information model based on the monitored accesses, identifying an association between a user request and the access pattern of the information model, and providing direct access to the information model based on the identified association.

In accordance with methods consistent with the present invention, a method in a data processing system is provided. The data processing system has a business service application and an information model node associated with the business service application. The method comprises monitoring access to an information model node associated with the business service application and generating an access pattern for the information model node based on a number of monitored accesses to the information model node.

In accordance with articles of manufacture consistent with the present invention, a computer-readable medium containing instructions for controlling a data processing system to perform a method is provided. The data processing system has a business service application and an information model node associated with the business service application. The method comprising: monitoring access to the information model node, and generating an access pattern for the information model node based on a number of monitored accesses to the information model node.

In accordance with systems consistent with the present invention, a data processing system is provided. The data processing system comprises a storage having a plurality of information model nodes, a cache memory, and a memory device. The memory device comprises a business service application associated with the information model nodes, and a cache manager program that monitors access to each information model node, and generates an access pattern for each information model node based on a number of monitored accesses to the respective information model node. The data processing system further includes a processor that runs the cache manager program.

In accordance with systems consistent with the present invention, a system is provided that includes means for monitoring access to an information model node associated with a business service application, and means for generating an access pattern for the information model node based on a number of monitored accesses to the information model node. In one implementation, the system further includes a cache memory, and means for storing the information model node in cache memory based on the access pattern of the information model node.

The above-mentioned and other features, utilities, and advantages of the invention will become apparent from the following detailed description of the preferred embodiments of the invention together with the accompanying drawings.

Other systems, methods, features, and advantages of the invention will become apparent to one having skill in the art upon examination of the following figures and detailed description. It is intended that all such additional systems, methods, features, and advantages be included within this description, be within the scope of the invention, and be protected by the accompanying drawings.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION OF THE INVENTION

Reference will now be made in detail to an implementation consistent with the present invention as illustrated in the accompanying drawings. Wherever possible, the same reference numbers will be used throughout the drawings and the following description to refer to the same or like parts.

Figure 1:
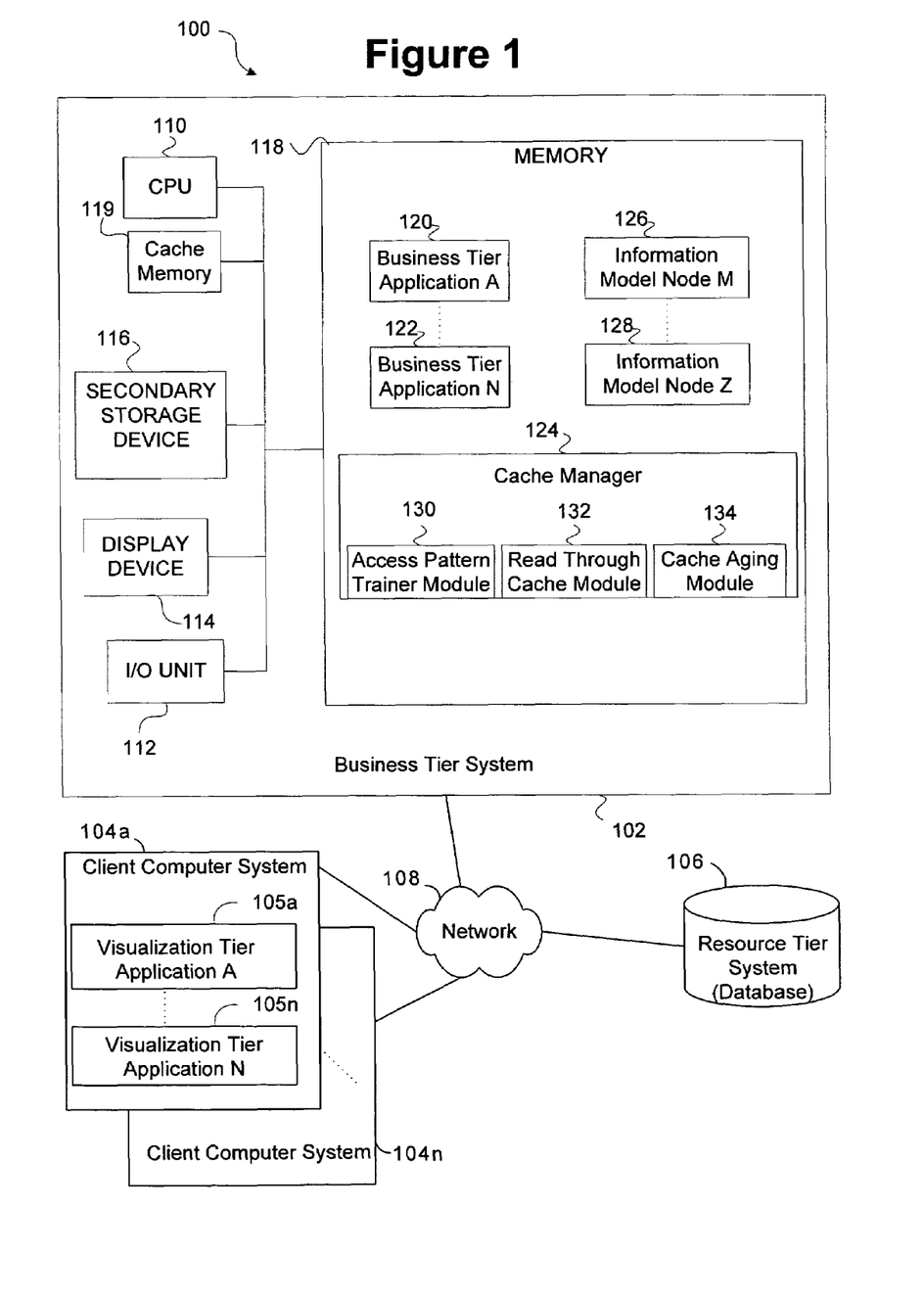
FIG. 1 depicts an exemplary block diagram of a data processing system in accordance with methods and systems consistent with the present invention.
Figure 2:
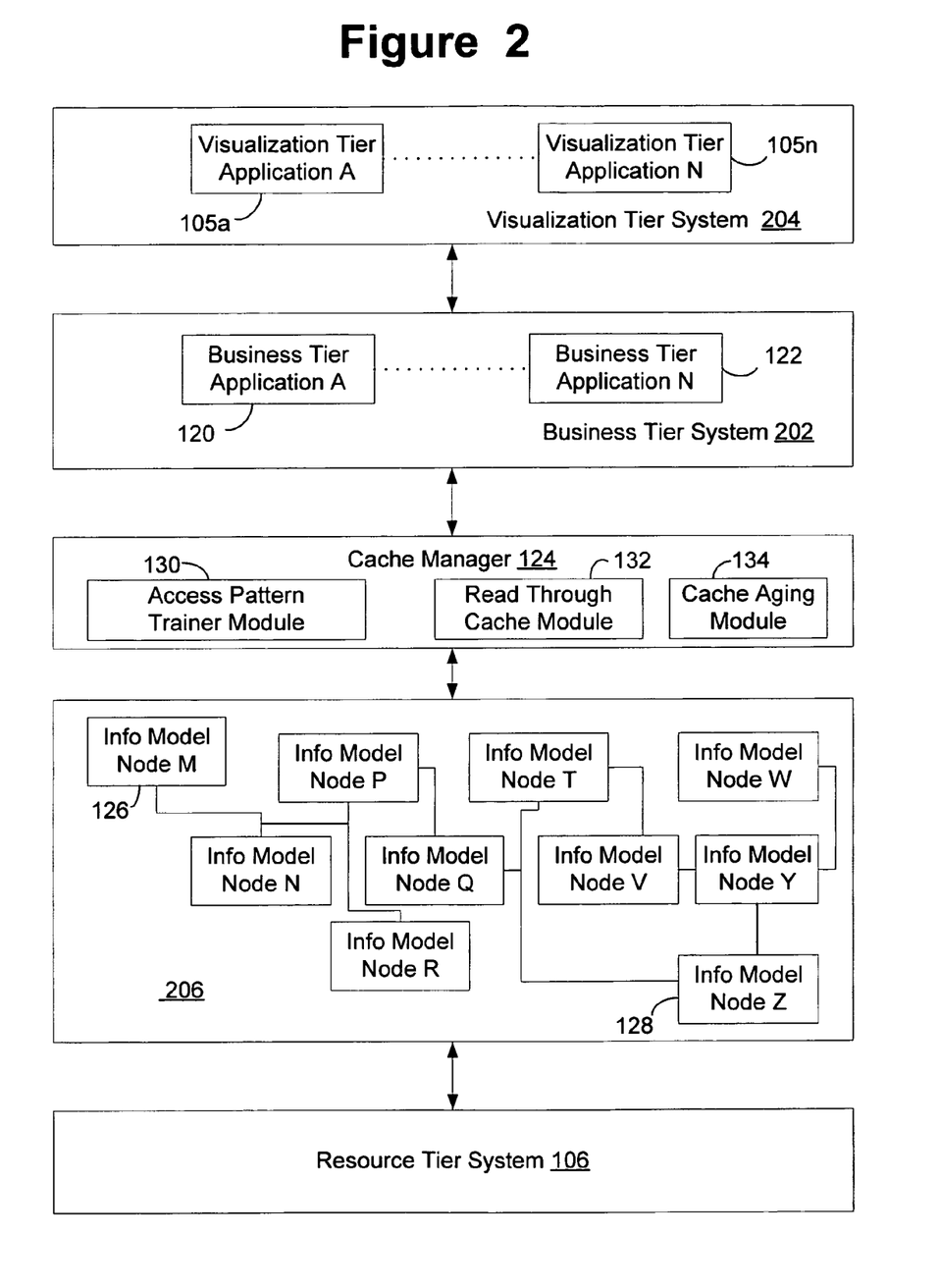
FIG. 2 depicts an exemplary functional block diagram of the data processing system.

FIG. 1 depicts a block diagram of a data processing system 100 suitable for use with methods and systems consistent with the present invention. FIG. 2 depicts an exemplary functional block diagram of the data processing system 100. Data processing system 100 is referred to hereinafter as "the system." The system 100 has a tiered architecture for implementing and managing one or more business service applications of an enterprise. The system 100 comprises a business tier system 102 (shown functionally as business tier system 202 in FIG. 2), one or more client computer systems 104*a*-104*n* that collectively function as a visualization tier system 204 in FIG. 2, and a resource tier system 106. The business tier system 102 is operatively connected to each client computer system 104*a*-104*n* and to the resource tier system 106 across a network 108. The network 108 may be any known private or public communication network, such as a local area network ("LAN"), WAN, Peer-to-Peer, or the Internet, using standard communications protocols. The network 108 may include hardwired as well as wireless branches.

The business tier system 102 may be a Sun® SPARC® data processing system running the Solaris® operating system. One having skill in the art will appreciate that devices and programs other than those described in the illustrative examples can be implemented. Sun, Java, and Solaris are trademarks or registered trademarks of Sun Microsystems, Inc., Palo Alto, Calif., in the United States and other countries. SPARC is a registered trademark of SPARC International, Inc., in the United States and other countries. Other names may be trademarks or registered trademarks of their respective owners. The business tier system 102 comprises a central processing unit ("CPU") 110, an input/output ("I/O") unit 112, a display device 114, a secondary storage device 116, a memory 118, and a cache memory 119. The business tier system 102 may further comprise standard input devices such as a keyboard, a mouse or a speech processing means (each not illustrated).

Client computer systems 104*a*-104*n* each comprise similar components to those of the services system, such as a CPU, a memory, an I/O unit, a display device, and a secondary storage device. In one implementation, each client computer system 104*a*-104*n* may be any general-purpose computer system such as an IBM compatible, Apple, or other equivalent computer.

Memory 118 of business tier system 102 comprises one or more business tier applications 120 and 122 (also referenced as "business service applications") that are operatively configured to receive data from or transmit data to visualization tier applications 105*a*-105*n* operating on client computer systems 104*a*-104*n*. For example, visualization tier application "A" 105*a* may be a browser program for interfacing to the business tier application "A" 120, which may be a web server application for a product fault reporting and identification service for an enterprise implementing the system 100. Alternatively, visualization tier application "N" 105*n* may be a user interface for accessing a document editor and maintenance service program (e.g., business service application "N" 122), such as Docs Open® commercially available from Hummingbird Ltd.

Memory 118 also includes a cache manager 124 and one or more information model nodes 126 and 128 that are operatively configured to connect a respective business service application 120 or 122 to related persistent data, which may reside in the resource tier system 106. As shown in FIG. 2, the cache manager 124 facilitates access to one or more of the information model nodes 126 and 128 that are responsive to a query or request from a business service application 120 or 122 consistent with methods and systems of the present invention. In one implementation, the information model nodes 126 and 128 function as an interim translation layer 206 for access to corresponding persistent data that may reside in or be read from the resource tier system 106. As discussed in further detail below, one or more of the nodes 126 and 128 in the information model may be initially read from the resource tier system 106 into memory 118 or cache memory 119 to improve the time for responding to a query from a business service application 120 or 122.

The cache manager 124 has an "access pattern trainer module" 130 that is operatively configured to monitor access to an information model node associated with a business service application and generate an access pattern for the information model node based on a number of accesses to the information model node, and store the access pattern in association with the information model. Upon receiving a query or request from the business service application, the cache manager 124 is operably configured to determine whether an information model is responsive to the request based on the access pattern of the respective information model node.

The cache manager 124 may also have a "read through cache module" 132 that enables data written to or read from memory 118 to be read through the cache memory 119. Thus, when reading data from the resource tier system 106 to memory 118, the cache manager 124 is able to direct data read from memory 118 (e.g., query data from a business service application 120 or 122) or data read from resource tier system 106 (e.g., persistent data associated with an information model node 126 or 128) to also be read by the access pattern trainer module 130.

In one implementation, the cache manager 124 stores in the cache memory 119 the information model nodes 126 and 128 that have been frequently used in response to a business service application query or request. As discussed in further detail below, the cache manager 124 may use the access pattern associated with the information model nodes 126 and 128 stored in the cache memory 119 to predict or identify a responsive information model node for a next query or request received from a respective business service application. In this implementation, the cache manager 124 may include a cache aging module 134 that is operatively configured to determine whether an information model node 126 or 128 stored in the cache memory 119 has been accessed within a predetermined period and deleting the respective information model node from the cache memory 119 in response to determining that the node has not been accessed within the predetermined period.

One having skill in the art will appreciate that the cache manager 124 and modules 130, 132, and 134 may each be a stand-alone program residing in memory on a data processing system other than business tier system 102. The cache manager 124 and modules 130, 132, and 134 may each comprise or may be included in one or more code sections containing instructions for performing their respective operations. While the cache manager 124 and modules 130, 132, and 134 are described as being implemented as software, the present implementation may be implemented as a combination of hardware and software or hardware alone. Also, one having skill in the art will appreciate that the cache manager 124 and modules 130, 132, and 134 may comprise or may be included in a data processing system, which may be a client or a server, communicating with the business tier system 102.

The resource tier system 106 may be a database accessible by the cache manager 124 via a RDBMS (not shown in figures). Alternatively, the resource tier system 106 may be a file server accessible by the cache manager 124, for example, via a Lightweight Directory Access Protocol ("LDAP") (not shown in figures).

Although aspects of methods, systems, and articles of manufacture consistent with the present invention are depicted as being stored in memory, one having skill in the art will appreciate that these aspects may be stored on or read from other computer-readable media, such as secondary storage devices, like hard disks, floppy disks, and CD-ROM; a carrier wave received from a network such as the Internet; or other forms of ROM or RAM either currently known or later developed. Further, although specific components of the data processing system 100 have been described, one having skill in the art will appreciate that a data processing system suitable for use with methods, systems, and articles of manufacture consistent with the present invention may contain additional or different components. A computer readable storage medium includes as secondary storage devices, like hard disks, floppy disks, and CD-ROM.

Figure 3:
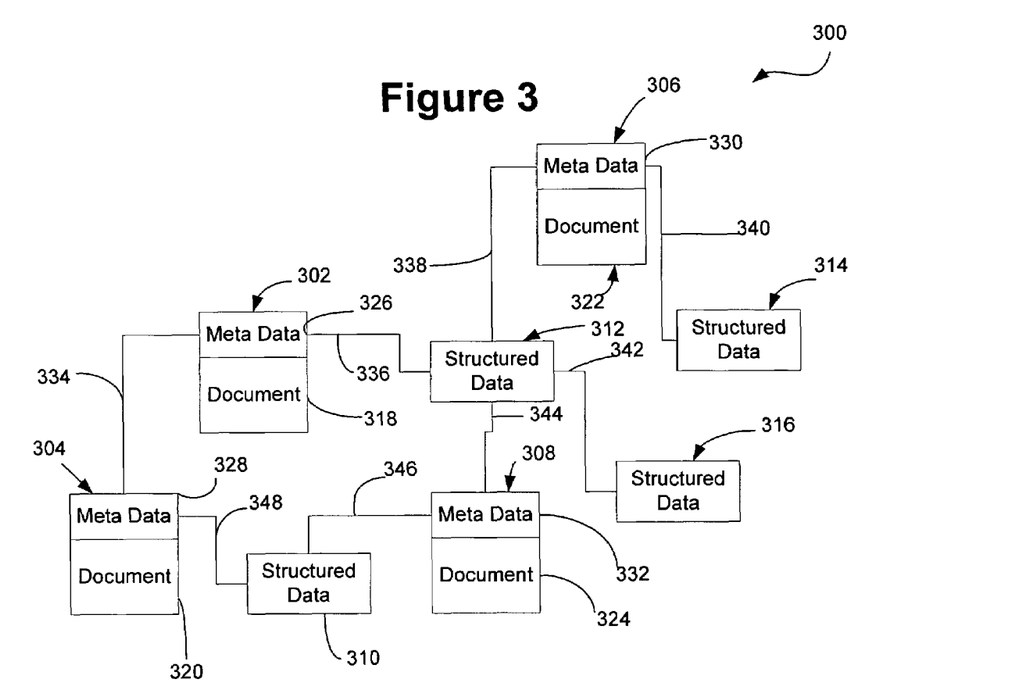
FIG. 3 depicts a block diagram of an exemplary information model having nodes that may be accessed by a business service application of the data processing system.

FIG. 3 depicts an exemplary infrastructure 300 of information model nodes 302 . . . 316 that may be designed for and accessed by a business service application 120 or 122 of the system 100. The information model nodes 302 . . . 316 may be a portion of the information model nodes 126 and 128 maintained by the business tier system 102. As shown in FIG. 3, the information model nodes 302 . . . 316 may comprise content models 302 . . . 308 and data models 310 . . . 316. Each of the content models 302 . . . 308 includes respective unstructured data (e.g., a document or portion thereof) 318, 320, 322, and 324, and meta data 326, 328, 330, and 332 that describes the respective unstructured data. Each meta data 326, 328, 330, and 332 may include one or more data elements that identify characteristics of the unstructured data specified at the time the unstructured data was designed or created. For example, meta data 326, 328, 330, and 332 may each have data elements that identify an author, a creation date, and average size of the respective unstructured data 318, 320, 322, and 324.

Each of the data models 310 . . . 316 describes structured data relevant to a business service application 120 or 122. The data models 310 . . . 316 may be preexisting data models defined at the time the business service application 120 or 122 was designed or used. Each of the information model nodes has one or more static associations 334, 336, 338, 340, 342, 344, 346, and 348 each of which identifies a relationship to another node. Each of the static associations 334, 336, 338, 340, 342, 344, 346, and 348 may be a pointer or index to the other node.

Figure 4:
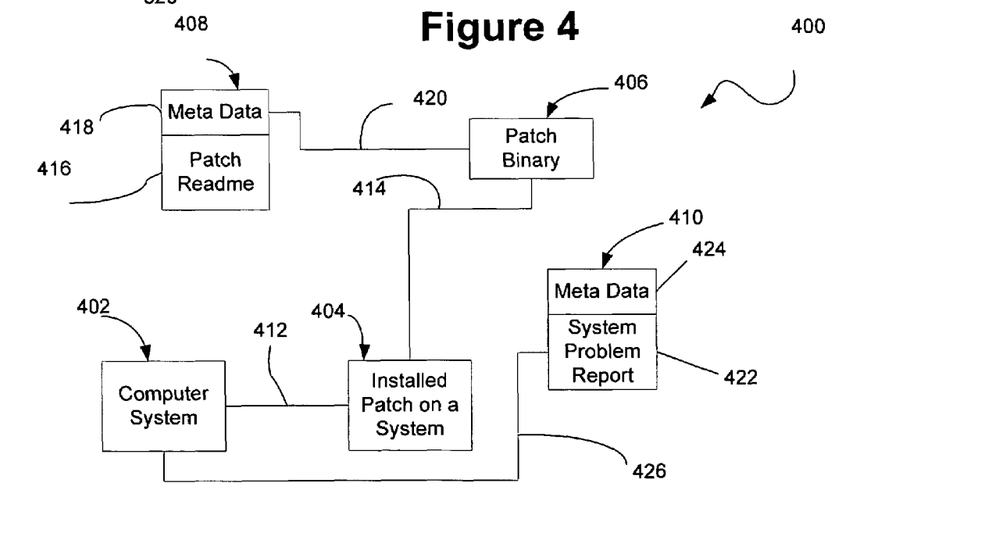
FIG. 4 depicts a block diagram of another exemplary infrastructure of information models that may be accessed by the business service application of the data processing system.

In the illustrative example shown in FIG. 4, the information model infrastructure 400 of information model nodes 402 . . . 410 are designed for a business service application 120 that corresponds to a computer system fault reporting and identification service. The information model infrastructure 400 for the computer system fault reporting and identification service may contain hundreds or thousands of nodes. However, for clarity in the description, only information model nodes 402 . . . 410 are illustrated. In this example, the information model node 402 corresponds to structured data that describes elements of a computer system serviced by the business service application 120. TABLE 1 below identifies an illustrative format of the structured data for the information model node 402 to describe a computer system.

TABLE 1

| Category | Element Name | Sub-Element Name | Description | Data Type with delimiter (e.g., ";") to separate multiple entries |
|---|---|---|---|---|
| Hardware | Computer System | | Model number and configuration version for the computer system | String delimiter string |
| | Motherboard | | Model number of motherboard version in the computer system | String |
| | | CPU | Model numbers of compatible CPU | String |
| | | RAM | Type and size of compatible random access memory | String |
| | Video card | | Model numbers of compatible video card | String |
| | Modem | | Model numbers of compatible modem | String |
| | Hard drive controller | | Model numbers of compatible hard drive controller | String |
| | Hard drive | | Model numbers of compatible hard drive | String |
| | CD/DVD controller | | Model numbers of compatible controllers | String |
| | Display | | Model numbers of compatible displays | String |
| Software | Motherboard Firmware | | Filename/version | String delimiter string |
| | Operating System | | Filename/version | String delimiter string |

The information model node 404 corresponds to structured data that identifies that a patch has been created for and should be installed on the computer system described by information model node 402. The patch information model node 404 may include data elements that identify the patch (e.g., a patch filename, version number, a creation date, size, and author), the operating system name for installing the patch, and the computer system name in which the operating system is installed. Thus, a static data association 412 between nodes 402 and 404 may be identified when the information model node 404 is designed or created based on the operating system name or computer system name identified by both nodes 402 and 404. In one implementation, a data association may be reflected by a pointer to the related node. Thus, information model node 402 may have a pointer to information model node 404, and vice versa, to reflect the data association 412 between the two nodes.

Continuing with the example shown in FIG. 4, the information model node 406 corresponds to structured data that describes the patch identified by the information model node 404 and has an association 414 based on the patch filename identified by both nodes 404 and 406. The information model node 408 corresponds to a content model that has unstructured data (e.g., the "patch readme" document 416) written, for example, by the author of the patch to identify what fault the patch corrects and how to install the patch on the computer system identified by information model node 402. The information model node 408 also has meta data 418 that may identify the patch filename, a version number, the author of the document 412, and the date that the document 412 was created. Thus, when the information model node 408 is designed or created, an association 420 may be generated to reflect a relationship between the two nodes 406 and 408 based on a common data element, such as patch filename or patch author.

In the example shown in FIG. 4, the information model node 410 is a content model that has unstructured data (e.g., "system problem report" document 422) written, for example, by a customer reporting a problem or fault with a computer system as described by the information model node 402. The information model node 410 also has meta data 424 that identifies, for example, the customer that authored the report, a creation date, and the name of the computer system having the fault. In accordance with systems and methods consistent with the present invention, the customer may report a problem to the business service application 120 via a respective visualization tier application 105a on one of the client computer systems 104a-104n. The business service application 120 then generates and stores the information model node 410 on the resource tier system 106. In the implementation shown in FIG. 4, the information model node 410 (e.g., "system problem report" document 422) is initially designed to have a static association 426 with the information model node 402 ("computer system") to reflect a relationship between the two nodes 410 and 402 based on a common data element, such as computer system name. The designer of the information model depicted in FIG. 4 may have designed the information model nodes 402 and 410 and the association 426 before revising the information model to incorporate nodes 406 and 408 for handling a "patch" to, for example, the "operating system" software for the computer system identified by the instantion of the information model node 402. Thus, the designer of information model node 410 may not have foreseen what types of problems are associated with the computer system 402 that a customer may need to report and what corresponding corrections would be developed and made available.

To identify a correction for the reported fault identified in the "system problem report" document 422, the business service application 120 may query the information model infrastructure 400 via cache manager 124. In response to the query, the cache manager 124 may retrieve information model nodes 410, 402, 404, 406, and 408 in order based on associations 426, 412, 414, and 420 to determine that the fault identified in the system problem report of node 410 is the same as the fault identified in the "patch readme" document 416 of node 408. The access pattern trainer module 130 is able to monitor each access to the information model nodes 410, 402, 404, 406, and 408 to generate an access pattern for each node so that the cache manager 124 is able to receive a subsequent query associated with one node (e.g., another "system problem report" document 422) and identify a responsive information node (e.g., node 416) based on the access pattern of the one node. As described in further detail below, the cache manager 124 is able to recognize or predict that the "patch readme" document 416 of information node 408 is responsive to a subsequent query from the business service application (e.g., from another customer having a computer system depicted by node 402) based on the access pattern associated with the node 410 by the cache manager 124.

Figure 5:
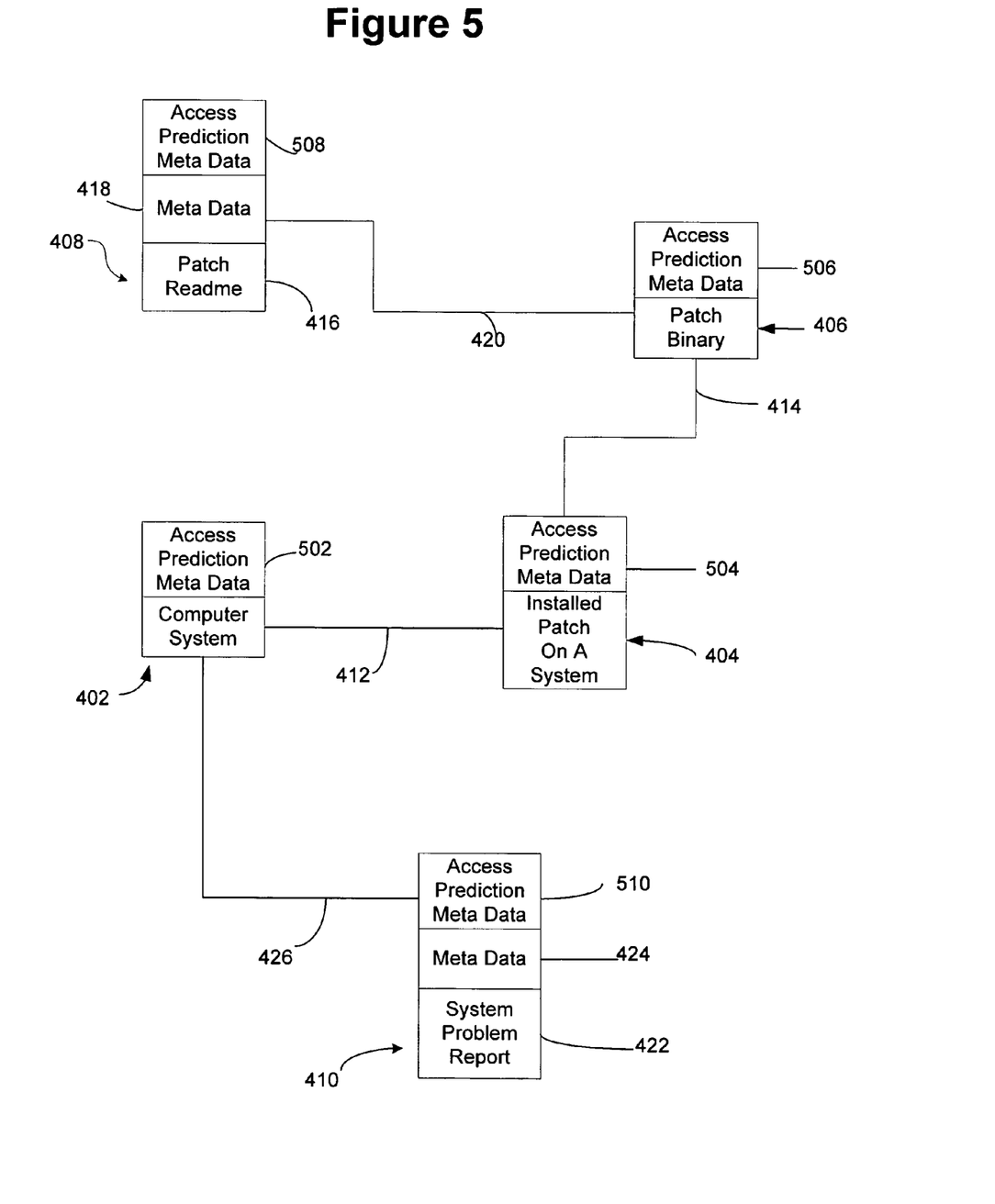
FIG. 5 depicts the information model nodes shown in FIG. 4 modified to each include access prediction meta data in accordance with methods and systems consistent with the present invention.

FIG. 5 depicts the information model nodes 402 ... 410 modified to each include respective access prediction meta data in accordance with methods and systems consistent with the present invention. In the implementation shown in FIG. 5, a designer of each information model node 402 ... 410 identifies access prediction meta data 502 ... 510 for the respective node 402 ... 410. Each access prediction meta data 502 ... 510 includes one or more not-deterministic elements that represent hints for the cache manager 124 to use in determining which of the information model nodes 402 ... 410 should be stored in the cache memory 119 so that a response to an anticipated query from the respective business service application 120 may be generated more quickly than accessing the information model nodes 402 ... 410 from persistent data storage in the resource tier system 106. For example, each access prediction meta data 502 ... 510 may include an expected average size of the structured or unstructured data associated with the information model node 402 ... 410. The expected average size is non-deterministic because the designer does not know (at the time the node 402 ... 410 is designed) the actual average size, for example, of each "patch readme" document 416 that may be generated and associated with a "patch binary" 406 based on the information model nodes 406 and 408 conceptualized by the designer. The cache manager 124 may use the expected average size provided in the access prediction meta data 502 ... 510 of the respective node 402 ... 410 to determine whether the node 402 ... 410 should be stored in the cache memory 119 in lieu of another node 402 ... 410 having a different expected average size.

Each access prediction meta data 502 ... 510 also may include other non-deterministic elements, such as an expected access number that reflects how frequently the respective information model node 402 ... 410 will be accessed in response to one or more queries from the business service application 120 associated with the information model nodes 402 ... 410. In one implementation, the cache manager 124 assigns a rank to each node 402 ... 410 based on the expected access number provided in the access prediction meta data 502 ... 510. If all nodes 402 ... 410 cannot be stored in the cache memory 119, the cache manager 124 may store the nodes 402 ... 410 in the cache memory 119 based on the rank assigned to each node 402 ... 410.

However, the business service applications 120 and 122 may be modified or changed over time or replaced with new business service applications that attempt to reuse the information model nodes 402 ... 410. In this implementation, the non-deterministic elements provided in the access prediction meta data 502 ... 510 associated with each information model node 402 ... 410 may no longer reflect how the information model nodes 402 ... 410 are being used by the respective business service applications 120 and 122. Accordingly, the cache manager 124 may improve the time to respond to a query from the business service applications 120 and 122 by deriving an access pattern for one or more nodes 402 ... 410 in the information model in accordance with methods consistent with the present invention.

Figure 6:
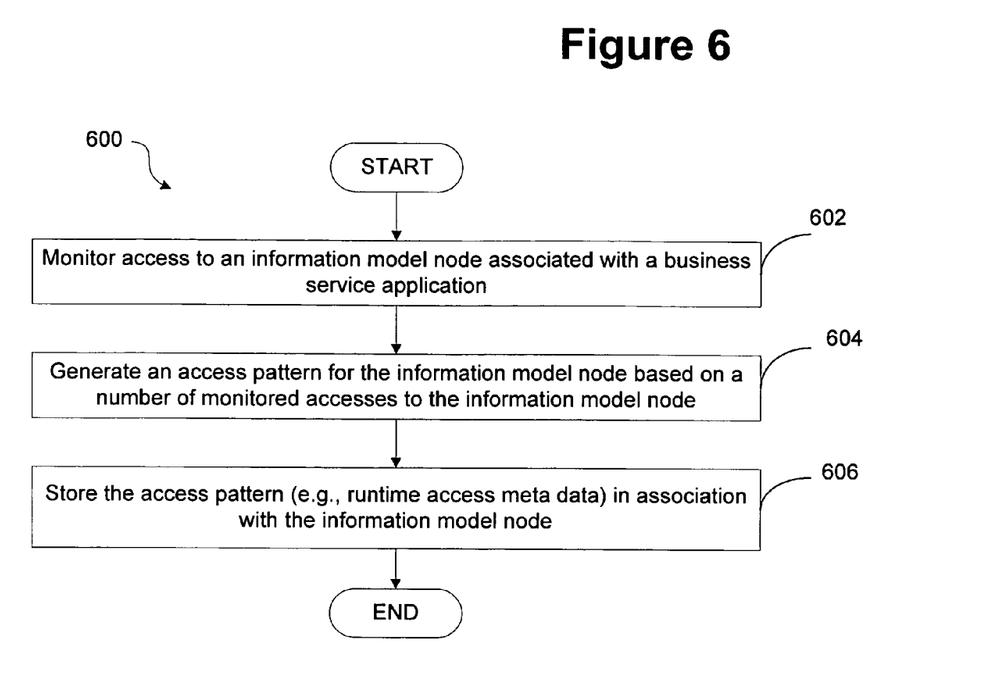
FIG. 6 depicts a flow diagram illustrating an exemplary process performed by a cache manager of the data processing system to identify an access pattern for an information model node associated with the business service application.

FIG. 6 depicts a flow diagram illustrating an exemplary process 600 performed by the cache manager 124 to identify an access pattern for an information model node associated with a business service application 120 or 122. Initially, the cache manager 124 monitors access to an information model node associated with a business service application (step 602). Continuing with the example information model depicted in FIG. 4, the cache manager 124 is able to monitor access to each of the information model nodes 402 ... 410 associated with the business service application 120. The cache manager 124 may monitor access to the information model nodes 402 ... 410 by evaluating each information model node 402 ... 410 that is read into memory 118, via "read through cache module" 132, from the resource tier system 106 in response to a query or request from the business service application 120 to access data or a data element (e.g., "computer system name" in Table 1) associated with one or more of the information model nodes 402 ... 410. For example, as discussed above, to identify a correction for the reported fault identified in the "system problem report" document 422, the business service application 120 may query or request data from the information model infrastructure 400 via cache manager 124. In response to the query or request, the cache manager 124 may retrieve information model nodes 410, 402, 404, 406, and 408 in order based on associations 426, 412, 414, and 420 to determine that the fault identified in the "system problem report" document 422 of node 410 is the same as the fault identified in the "patch readme" document 416 of node 408. In this example, the cache manager 124 is able to monitor or evaluate each information model node 410, 402, 404, and 408 based on the query or request from the business service application 120 to identify a correction for the reported fault identified in the "system problem report" document 422.

Figure 7:
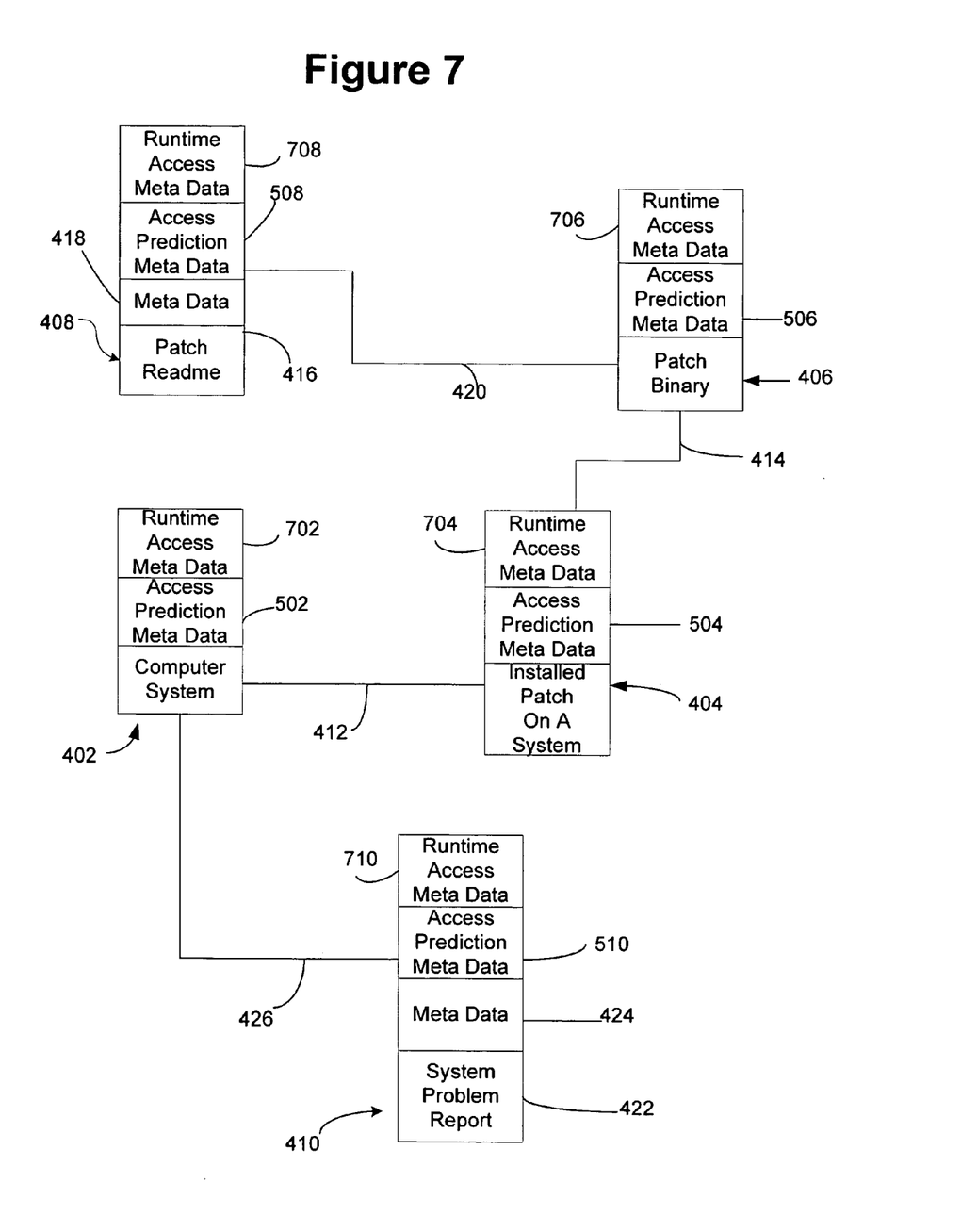
FIG. 7 depicts the information model nodes shown in FIG. 4 modified by the cache manager so that at least one information model node includes an access pattern having runtime access meta data.

Next, the cache manager 124 generates or updates an access pattern for the information model node based on a number of monitored accesses to the information model node (step 604). For example, when the cache manager 124 retrieves each of the information model nodes 402 ... 410 in response to the business service application's 120 query or request for a correction for the reported fault identified in the "system problem report" document 422, the cache manager 124 is able to determine whether the monitored node (e.g., node 410) has an access pattern. If the monitored node does not have an access pattern, the cache manager 124 generates a new access pattern by creating runtime access meta data for the node 402 ... 410 and initializes an access number in the access pattern. FIG. 7 depicts the information model nodes 402 ... 410 as modified by the cache manager 124 to store a respective access pattern having runtime access meta data 702 ... 710 in association with each node 402 ... 410. The next time the node 402 ... 410 is read by the cache manager 124 in response to another query from the business service application 120, the cache manager 124 updates the access pattern of the node by, for example, incrementing the access number stored in the runtime access meta data 702 ... 710 associated with the respective node 402 ... 410. In one implementation, the cache manager 124 also stores, as part of the access pattern for the node 402 ... 410, a date when the access number in the runtime access meta data 702 ... 710 associated with the node was last updated. The cache manager 124 may use the date and the access number stored in the access pattern of a node 402 ... 410 to determine whether the node 402 ... 410 should be stored in the cache memory 119 as discussed below.

The cache manager 124 then stores the access pattern (e.g., the runtime access meta data 702, 704, 706, 708, or 710) in association with the information model node 410, 402, 404, 406, or 416 (step 606). The cache manager 124 may store the access pattern with the information model node on the resource tier system 106 or in secondary storage device 116. The cache manager 124 may then use the access pattern of each node 402 ... 410 to determine whether the node 402 ... 410 should be stored in the cache memory 119 to facilitate a more rapid response to a subsequent query from the business service application 120.

Figure 8:
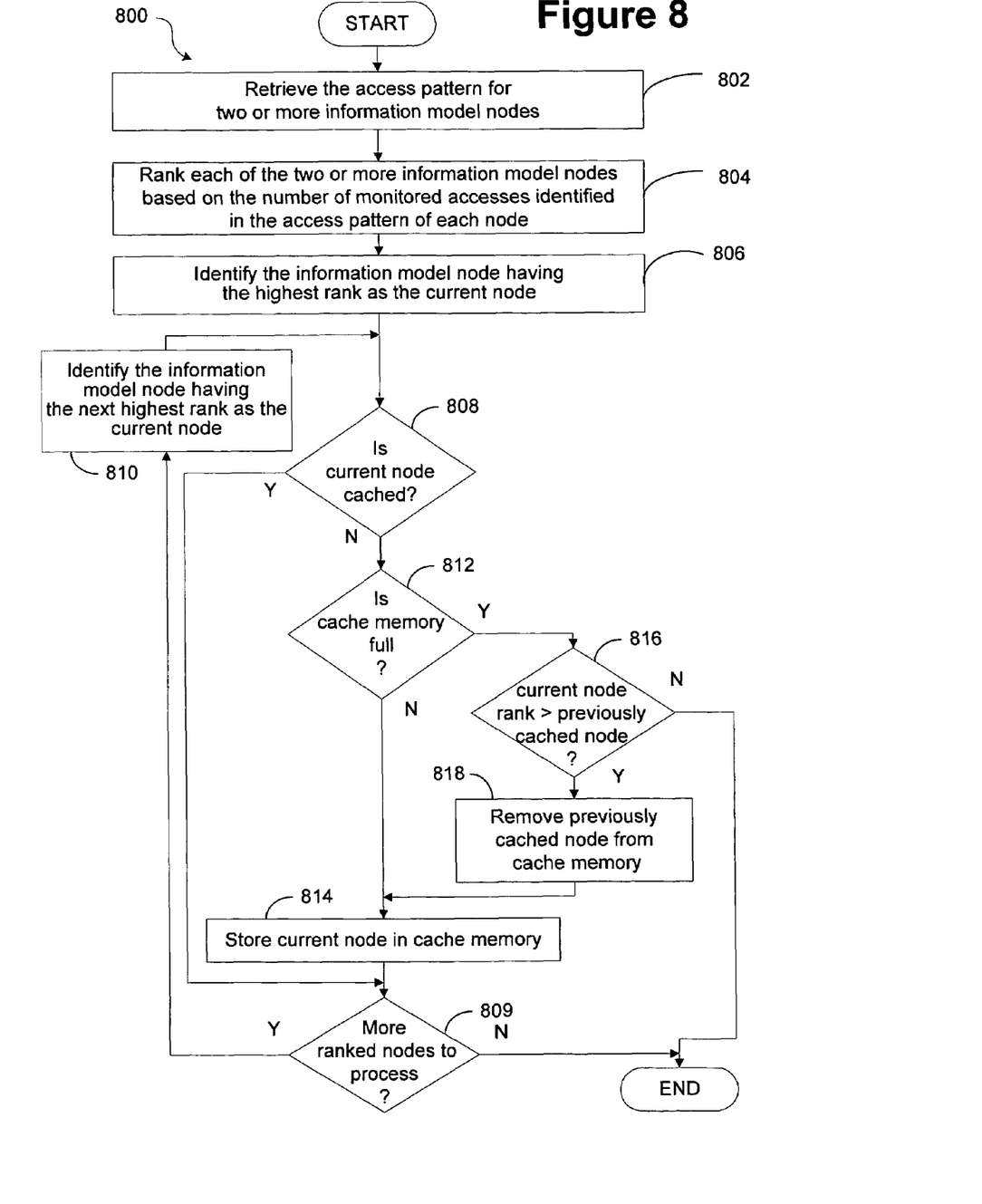
FIG. 8 depicts a flow diagram illustrating another exemplary process performed by the cache manager of the data processing system to identify an information model node to be stored in cache memory based on the access pattern associated with the information model node.

FIG. 8 depicts a flow diagram illustrating another exemplary process 800 performed by the cache manager 124 to identify an information model node to be stored in the cache memory 119 based on the access pattern associated with the information model node. Initially, the cache manager 124 retrieves the access pattern for two or more information model nodes 402 . . . 410 (step 802). In the implementation shown in FIG. 7, the cache manager 124 may retrieve the access pattern of each node 402 . . . 410 by retrieving the runtime access meta data 702 . . . 710 previously stored by the cache manager 124 in association with the respective node 402 . . . 410. In one implementation, the cache manager 124 is able to recognize whether an information model node 402 . . . 410 was previously cached or stored in the cache memory 119 and includes the previously stored cached node in the two or more information model nodes 402 . . . 410 in the process 600.

The cache manager 124 then ranks each of the two or more information model nodes 402 . . . 410 based on the number of monitored accesses (i.e., the access number) identified in the access pattern of each node (step 804). Assuming multiple customers that own or operate a computer system identified by information model node 402, a significant portion of the customers may have reported within a predefined period (e.g., last month) a fault to the business service application 120 (e.g., the product fault reporting and identification service for enterprise) to cause the business service application 120 to query the information model infrastructure 700 as modified by the cache manager 124 to identify a correction to the reported fault. Accordingly, each of the nodes 402 . . . 410 may have an access number that is significantly higher than other nodes (not shown in FIG. 7) of the same information model for the predetermined period. As a result, nodes 402 . . . 410 may have a higher ranking than other nodes in the same information model for the predetermined period.

After ranking the two or more information model nodes 402 . . . 410, the cache manager 124 identifies the information model node having the highest rank (e.g., node 402) as the current node (step 806). The cache manager 124 then determines whether the current node 402 is already cached or stored in the cache memory 119 (step 808). If the current node is already cached, the cache manager 124 then determines whether there are more ranked nodes to process (step 809). If there are more ranked nodes, the cache manager 124 then identifies the information model node having the next highest rank (e.g., node 406) as the current node (step 810) and continues processing at step 808.

If the current node is not already cached, the cache manager 124 then determines whether the cache memory 119 is full (step 812). In one implementation, the cache manager 124 determines the cache memory 119 is full if the cache memory 119 has insufficient space to store the current node. If the cache memory 119 is not full, the cache manager 124 stores the current node in the cache memory 119 (step 814) and continues processing at step 809.

If the cache memory 119 is full, the cache manager 124 determines whether the current node has a higher rank than a previously cached node (step 816). If the current node has a higher rank than the previously cached node, the cache manager 124 removes the previously cached node from the cache memory 119 (step 818) and continues processing at step 814 to store the current node in the cache memory 119. If the current node does not have a higher rank than the previously cached node or if there are no more ranked nodes, the cache manager 124 ends processing.

The foregoing description of an implementation of the invention has been presented for purposes of illustration and description. It is not exhaustive and does not limit the invention to the precise form disclosed. Modifications and variations are possible in light of the above teachings or may be acquired from practicing the invention. For example, the described implementation includes software but the present implementation may be implemented as a combination of hardware and software or hardware alone. The invention may be implemented with both object-oriented and non-object-oriented programming systems. The scope of the invention is defined by the claims and their equivalents.

What is claimed is:

1. A method in a data processing system having a business service application, the method comprising the steps of:

monitoring, by using a computer, access to an information model node associated with the business service application, wherein the information model node is one of plurality of information model nodes associated with the business service application, the information model node includes an expected access number that reflects how frequently the information model node is accessed in response to one or more queries from the business service application, the information model node further comprises content models, each content model of the content models includes respective unstructured data and metadata that describes the respective unstructured data;

based on said monitoring, for each respective one of the information model nodes if a respective information model node does not have an existing access pattern associated therewith, generating a new access pattern based on a number of monitored accesses to the information model node by creating runtime access metadata for the respective information model node and initializing an access number in the new access pattern for the respective information model node, otherwise updating the existing access pattern for the respective information model node by incrementing an access number associated with the existing access pattern for the respective information model node, determining whether the respective one of the information model nodes should be stored in a cache memory of the data processing system based on rankings of the information model nodes determined according to each respective information model node's access number, and replacing a lower ranking one of the information model nodes previously stored in the cache memory with a current one of the information model nodes having a higher ranking when the cache memory is full.

2. The method of claim 1, further comprising storing respective access pattern of each of the information model nodes in association with respective information model node such that respective access pattern is retrievable with the respective information model node.

3. The method of claim 1, wherein monitoring access comprises: receiving a query from the business service application; determining whether the query is associated with one of the information model nodes; and determining the query is associated with the information model node, identifying the query as an access of the one of the information model nodes.

4. The method of claim 1, wherein the respective existing access pattern of a respective one of the information model nodes includes a number representative of monitored accesses to the information model nodes.

5. The method of claim 1, further comprising the steps of: determining whether the cache memory is full; and when the cache memory is full, determining whether a current one of the one of the information model nodes has a higher ranking than other information model node of the information model nodes previously stored in the cache memory.

6. The method of claim 5, further comprising removing the other information model node from the cache memory in response to determining that the current one information model node has a higher ranking than the other information model node.

7. The method of claim 5, further comprising storing the current information model node in the cache memory in response to determining that the current information model node has a higher ranking than the other information model node.

8. A computer-readable storage medium containing instructions for controlling a data processing system to perform steps:
   monitoring, by using a computer, access to an information model node associated with a business service application, wherein the information model node is one of plurality of information model nodes associated with the business service application, the information model node includes an expected access number that reflects how frequently the information model node is accessed in response to one or more queries from the business service application, the information model node further comprises content models, each content model of the content models includes respective unstructured data and metadata that describes the respective unstructured data;
   based on said monitoring, for each respective one of the information model nodes if a respective information model node does not have an existing access pattern associated therewith, generating a new access pattern based on a number of monitored accesses to the information model node by creating runtime access metadata for the respective information model node and initializing an access number in the new access pattern for the respective information model node, otherwise updating the existing access pattern for the respective information model node by incrementing an access number associated with the existing access pattern for the respective information model node,
   determining whether the respective one of the information model nodes should be stored in a cache memory of the data processing system based on rankings of the information model nodes determined according to each respective information model node's access number, and
   replacing a lower ranking one of the information model nodes previously stored in the cache memory with a current one of the information model nodes having a higher ranking when the cache memory is full.

9. The computer-readable storage medium of claim 8, wherein storing respective access pattern of each of the information model nodes in association with each respective information model node such that the respective access pattern is retrievable with the respective information model node.

10. The computer-readable storage medium of claim 8, wherein monitoring access comprises the steps of:
   receiving a query from the business service application;
   determining whether the query is associated with one of the information model nodes; and identifying the query as an access of one of the information model nodes when the query is associated with one of the information mode nodes.

11. The computer-readable storage medium of claim 8, wherein a respective existing access pattern of a respective one of the information model nodes includes a number representative of monitored accesses to the information model nodes.

12. The computer-readable storage medium of claim 8, determining whether the cache memory is full; and when the cache memory is full, determining whether a current one of the information model nodes has a higher ranking than other information model node of the information model nodes previously stored in the cache memory.

13. The computer-readable storage medium of claim 12, further comprising the step of removing the other information model node from the cache memory in response to determining that the current information model node has a higher ranking than the other information model node.

14. The computer-readable storage medium of claim 12, further comprising the step of storing the current information model node in the cache memory in response to determining that the current information model node has a higher ranking than the other information model node.

15. A data processing system, comprising:
   a storage having a plurality of information model nodes;
   a cache memory;
   a memory device comprising a business service application associated with the information model nodes, and a cache manager program that:
      monitors access to an information model node associated with the business service application, wherein the information model node is one of the plurality of information model nodes associated with the business service application, the information model node includes an expected access number that reflects how frequently the information model node is accessed in response to one or more queries from the business service application, the information model node further comprises content models, each content model of the content models includes respective unstructured data and metadata that describes the respective unstructured data;
   based on said monitoring, for each respective one of the information model nodes if a respective information model node does not have an existing access pattern associated therewith, generates a new access pattern based on a number of monitored accesses to the information model node by creating runtime access metadata for the respective information model node and initializes an access number in the new access pattern for the respective information model node, otherwise updates the existing access pattern for the respective information model node by incrementing an access number associated with the existing access pattern for the respective information model node;
   determine whether the respective one of the information model nodes should be stored in the cache memory of the data processing system based on rankings of the information model nodes determined according to each respective information model node's access number;
   replace a lower ranking one of the information model nodes previously stored in the cache memory with a current one of the information model nodes having a higher ranking when the cache memory is full; and
   a processor that runs the cache manager program.

16. The data processing system of claim 15, wherein the cache manager program further stores the access pattern for each information model node in association with respective information model node.

17. The data processing system of claim 15, wherein when performing the step of monitoring access, the cache manager program receives a query from the business service application and determines whether the query is associated with one of the information model nodes; and identifying the query as an access of the information model node when the query is associated with one of the information model nodes.

18. The data processing system of claim 15, wherein the access pattern of each information model node includes a number representative of monitored accesses to the respective information model node.

19. The data processing system of claim 15, wherein the cache manager program further determines whether the cache memory is full; and when the cache memory is full, determines whether a current one of the information model nodes has a higher ranking than another of the information model nodes previously stored in the cache memory.

20. The data processing system of claim 19, wherein the cache manager program further removes the other information model node from the cache memory in response to determining that the current information model node has a higher ranking than the other information model node.

21. The data processing system of claim 19, wherein the cache manager program further stores the current one information model node in the cache memory in response to determining that the current one information model node has a higher ranking than the other information model node.

\* \* \* \* \*

UNITED STATES PATENT AND TRADEMARK OFFICE
CERTIFICATE OF CORRECTION

| | | |
|---|---|---|
| PATENT NO. | : 7,707,187 B1 | Page 1 of 1 |
| APPLICATION NO. | : 11/080085 | |
| DATED | : April 27, 2010 | |
| INVENTOR(S) | : Michael J. Wookey et al. | |

It is certified that error appears in the above-identified patent and that said Letters Patent is hereby corrected as shown below:

In column 1, line 13, delete "MODE" and insert -- MODEL --, therefor.

In column 8, line 38, delete "instantion" and insert -- instantiation --, therefor.

In column 12, line 61, in claim 4, delete "the" and insert -- a --, therefor.

In column 13, line 1, in claim 5, before "information" delete "one of the".

In column 13, line 6, in claim 6, after "current" delete "one".

In column 15, line 14, in claim 19, after "model" delete "node".

In column 16, line 9, in claim 21, after "current" delete "one".

In column 16, line 11, in claim 21, after "current" delete "one".

Signed and Sealed this
Fifth Day of June, 2012

David J. Kappos
*Director of the United States Patent and Trademark Office*